United States Patent
Okamoto et al.

(10) Patent No.: US 6,943,481 B2
(45) Date of Patent: Sep. 13, 2005

(54) VIBRATION MEMBER AND VIBRATION WAVE DRIVING APPARATUS

(75) Inventors: Takuji Okamoto, Kanagawa (JP); Eiichi Yanagi, Tokyo (JP); Masaharu Suzuki, Kanagawa (JP); Yoshifumi Nishimoto, Tokyo (JP); Hirokazu Hashidume, Tokyo (JP); Osamu Yanase, Kanagawa (JP)

(73) Assignees: Canon Precision Kabushiki Kaisha, Tokyo (JP); Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 10/157,826

(22) Filed: May 31, 2002

(65) Prior Publication Data

US 2002/0195892 A1 Dec. 26, 2002

(30) Foreign Application Priority Data

Jun. 5, 2001 (JP) ........................................ 2001-169398
Jun. 12, 2001 (JP) ........................................ 2001-177358

(51) Int. Cl.$^7$ ............................................. H01L 41/08
(52) U.S. Cl. ............................. 310/323.06; 310/323.03
(58) Field of Search ....................... 310/323.03, 323.04, 310/323.06

(56) References Cited

U.S. PATENT DOCUMENTS

| | | | | |
|---|---|---|---|---|
| 4,484,099 A | * | 11/1984 | Kawai et al. ................ 310/317 |
| 4,504,760 A | * | 3/1985 | Yamamoto et al. ..... 310/323.06 |
| 4,786,836 A | * | 11/1988 | Tokushima ............. 310/323.07 |
| 4,829,209 A | * | 5/1989 | Kawasaki et al. ...... 310/323.06 |
| 5,140,214 A | | 8/1992 | Kimura et al. ............... 310/323 |
| 5,192,890 A | | 3/1993 | Kimura et al. ............... 310/323 |
| 5,408,156 A | * | 4/1995 | Kawasaki et al. ...... 310/323.06 |
| 5,484,216 A | | 1/1996 | Kimura et al. ............... 400/319 |
| 5,698,929 A | | 12/1997 | Seki et al. .................... 310/323 |

* cited by examiner

*Primary Examiner*—Mark Budd
(74) *Attorney, Agent, or Firm*—Fitzpatrick, Cella, Harper & Scinto

(57) ABSTRACT

The present invention has been devised in order to raise driving efficiency of the vibration wave driving apparatus. A vibration member of a vibration wave driving apparatus of the present invention comprises the vibration member constituted of an elastic member and an electro-mechanical energy conversion element, and a rotor contacting the vibration member, and the vibration member generates a travelling wave in the elastic member when an alternating signal is applied to the electro-mechanical energy conversion element, in which an electrode film provided on a surface of the electro-mechanical energy conversion element of the vibration member is divided into a plurality of circular areas with different radiuses and each circular area is divided into a plurality of electrodes along its peripheral direction.

6 Claims, 12 Drawing Sheets

27

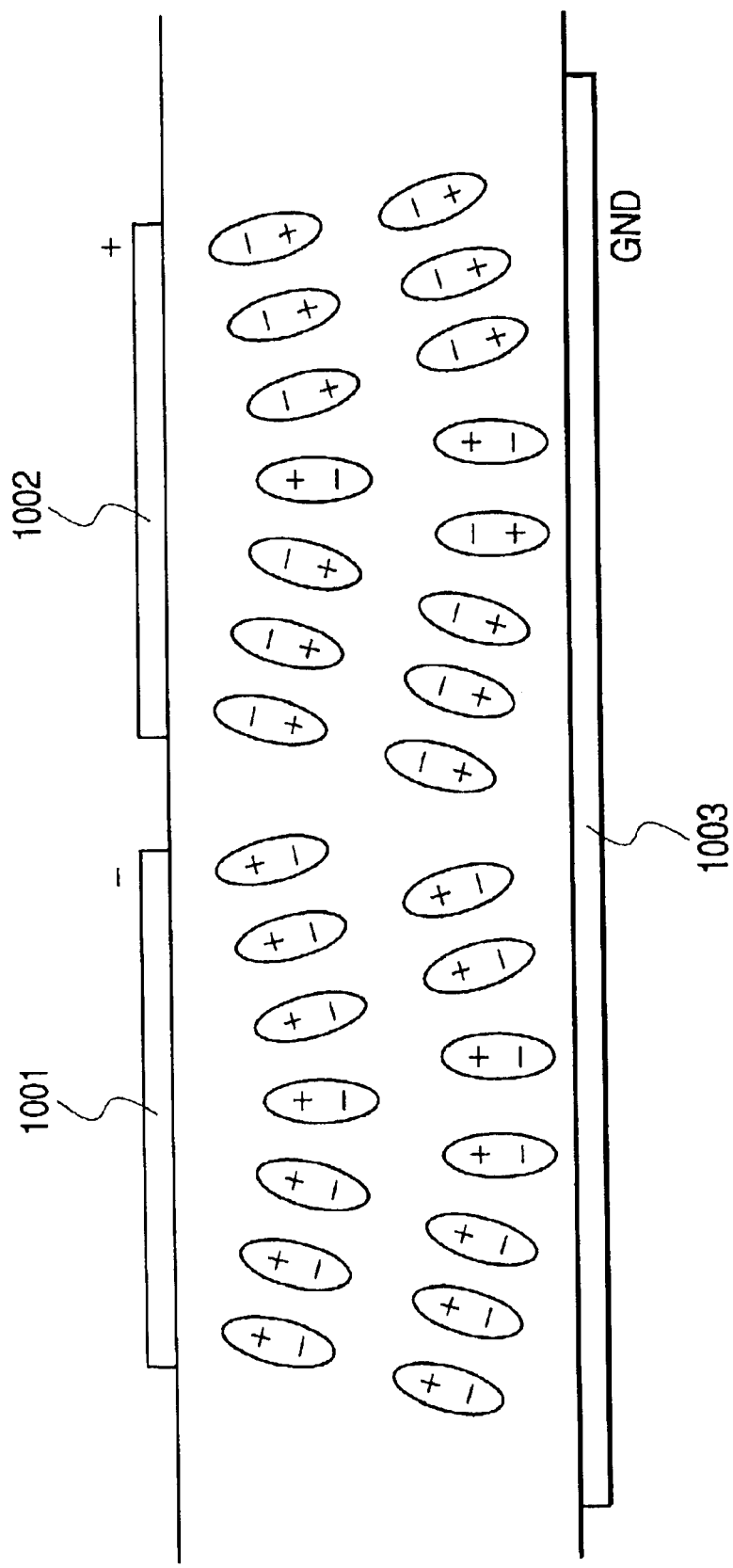

VIBRATION MEMBER AND VIBRATION WAVE DRIVING APPARATUS

BACKGROUND OF THE INVENTION

1. Field of the Invention

The present invention relates to a vibration wave driving apparatus such as a vibration wave motor using a vibration, which an elastic member is caused to generate, as a driving force and, more specifically, to a structure of an electro-mechanical energy conversion element for causing the elastic member to generate a vibration.

2. Related Background Art

FIG. 13 is a sectional view of a vibration wave motor.

In the figure, reference numeral 40 denotes a vibration member, which is constituted of an elastic member 10 made of metal or the like, a piezoelectric element 20 functioning as an electro-mechanical energy conversion element and a frictional member 30. The piezoelectric element 20 is fixed to one side of the elastic member 10 and the frictional member 30 is fixed to the other side.

The vibration member 40 is fixed to a housing 50 and a case 110 is fixed to the housing 50. Bearings 120a and 120b are fixed to the case 110 and the housing 50. The bearings 120a and 120b rotatably support a rotary shaft 100.

A rotor 60 having the rotary shaft 100 as a center is pressurized to contact the frictional member 30 of the vibration member 40. The rotor 60 is pressurized toward the vibration member 40 by a pressurizing mechanism 90 consisting of a pressurizing spring 70 and a spring bracket 80. The spring bracket 80 is fixed to the rotary shaft 100 and the rotor 60, the pressurizing spring 70, the spring bracket 80 and the rotary shaft 100 integrally rotate.

The piezoelectric element 20 used for a vibration wave motor of a shape shown in FIG. 13 has a structure in which electrode films are provided on both sides of one piezoelectric ceramic of a circular plate shape. It is assumed that the electrode provided on one side is an electrode for applying a voltage from a power feeding substrate and the electrode provided on the other side is an electrode for ground. When an alternating voltage is applied to the piezoelectric element 20, standing wave vibrations of different phases A and B are composited to generate a travelling wave on the surface of the elastic member 10.

FIG. 14A shows an example of a conventional electrode pattern for inputting an alternating voltage. Given that a wavelength of a travelling wave is λ, a plurality of electrodes for the A phase that are alternately polarized in opposite directions at a λ/2 pitch in their thickness direction and a plurality of electrodes for the B phase that are λ/4 apart from the electrodes for the A phase and are alternately polarized in opposite directions at a λ/2 pitch in their thickness direction are formed. FIG. 14B shows an example of an electrode pattern for ground, in which a circular electrode along a shape of a piezoelectric element is formed.

In the electrode pattern shown in FIG. 14A, the electrodes for the A phase are formed on one side of the circle and the electrodes for the B phase are formed on the other side. A vibration generated in the electrodes for the A phase has a smaller amplitude as the vibration travels farther from the electrodes. A vibration generated in the electrodes for the B phase has a smaller amplitude as the vibration travels farther from the electrodes.

This state is shown in FIGS. 15A to 15C. In the figures, the horizontal axis indicates a distance in a peripheral direction of the piezoelectric element and the vertical axis indicates a magnitude of a vibration amplitude. FIG. 15A shows a standing wave vibration generated in the electrodes for the A phase in its left half and shows a standing wave vibration generated in the electrodes for the B phase in its right half.

FIG. 15C shows a vibration amplitude of a travelling wave in which an A phase standing wave and a B phase standing wave are composited. Since the amplitude of the travelling wave is nonuniform in the peripheral direction, loci of rotational movements generated on the surface of the elastic member 10 are different as shown in FIG. 15B.

When there is unevenness in the vibration amplitude generated by the piezoelectric element as described above, since slipping occurs between the frictional member 30 of the elastic member 40 and the rotor 60, vibration energy cannot be used efficiently as driving energy. Therefore, unevenness in the vibration amplitude is not preferable.

There might be other factors that cause unevenness in the vibration amplitude generated by the piezoelectric element. Polarization processing of the piezoelectric element is performed by applying a voltage to the parts between the electrode patterns formed on both the sides of the piezoelectric element. Since an electric field at this point does not act on non-electrode portions as shown in FIG. 16, if the electrode patterns on both the sides of the piezoelectric element are different, a direction of an electric field applied to the parts between the electrode patterns becomes nonuniform and unevenness also occurs in a polarization direction. If unevenness exists in the polarization direction, since an elastic modulus of the piezoelectric element varies, unevenness also occurs in a vibration generated when a vibration wave driving apparatus is driven.

Therefore, in order to raise driving efficiency of the vibration wave driving apparatus, it is considered that there is still room for improvement.

SUMMARY OF THE INVENTION

The present invention has been devised in view of the above-mentioned drawbacks. It is an object of the present invention to provide a vibration member of a vibration wave driving apparatus including a vibration member constituted of an elastic member and an electro-mechanical energy conversion element; and a rotor contacting the vibration member. The vibration member generates a traveling wave in the elastic member when an alternating signal is applied to the electro-mechanical energy conversion element, in which an electrode film provided on a surface of the electro-mechanical energy conversion element of the vibration member is divided into a plurality of circular areas with different radiuses and each circular area is divided into a plurality of electrodes along its peripheral direction.

It is another object of the present invention to provide a vibration member of a vibration wave driving apparatus including a vibration member constituted of an elastic member and an electro-mechanical energy conversion element; and a rotor contacting the vibration member. The vibration member generates a traveling wave in the elastic member when an alternating signal is applied to the electro-mechanical energy conversion element, in which electrodes provided on opposing both sides of the electro-mechanical energy conversion element of the vibration member are formed in an identical shape and arranged in an identical phase.

BRIEF DESCRIPTION OF THE DRAWINGS

FIG. 16 is a view showing a direction of an electric field at the time of polarization of the conventional piezoelectric element.

DESCRIPTION OF THE PREFERRED EMBODIMENT

The present invention is for raising a driving efficiency of a vibration wave driving apparatus by improving an electrode pattern of a piezoelectric element that is fixed to a vibration member 40 of the vibration wave driving apparatus.

Figure 1:
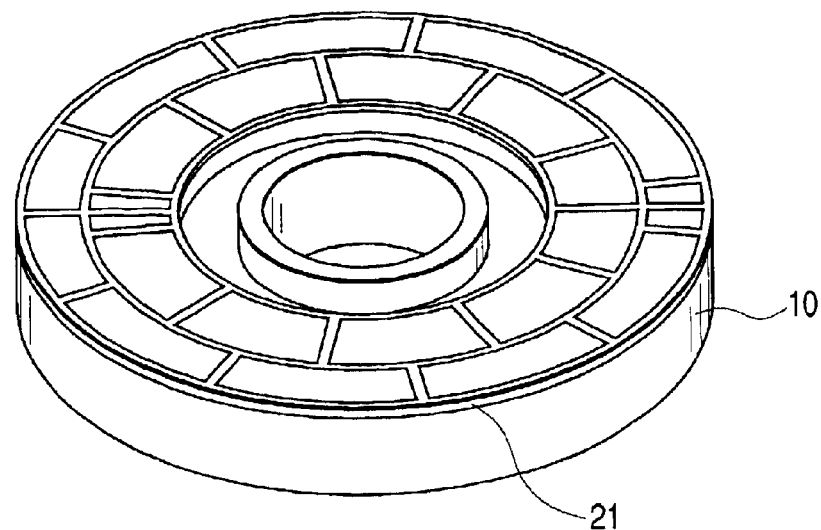
FIG. 1 is a perspective view of an elastic member and a piezoelectric element in accordance with the present invention.

FIG. 1 shows a vibration member in accordance with an embodiment of the present invention.

In the figure, reference numeral 10 denotes an elastic member, which is the same as a conventional elastic member. Reference numeral 21 denotes a piezoelectric element, which is different from the conventional piezoelectric element 20 in an electrode pattern for applying an alternating voltage when the vibration wave driving apparatus is driven.

Figure 2:
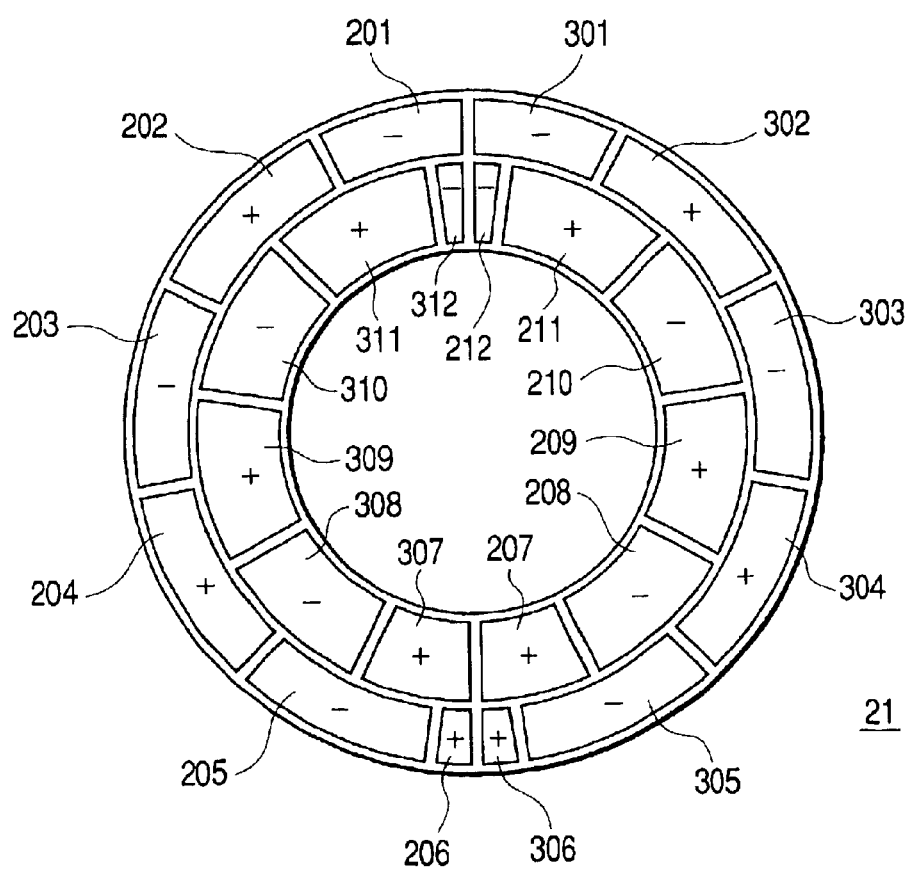
FIG. 2 is a view showing an electrode pattern formed in a plurality of circular areas with different radiuses on a front surface of a piezoelectric element.
Figure 3:
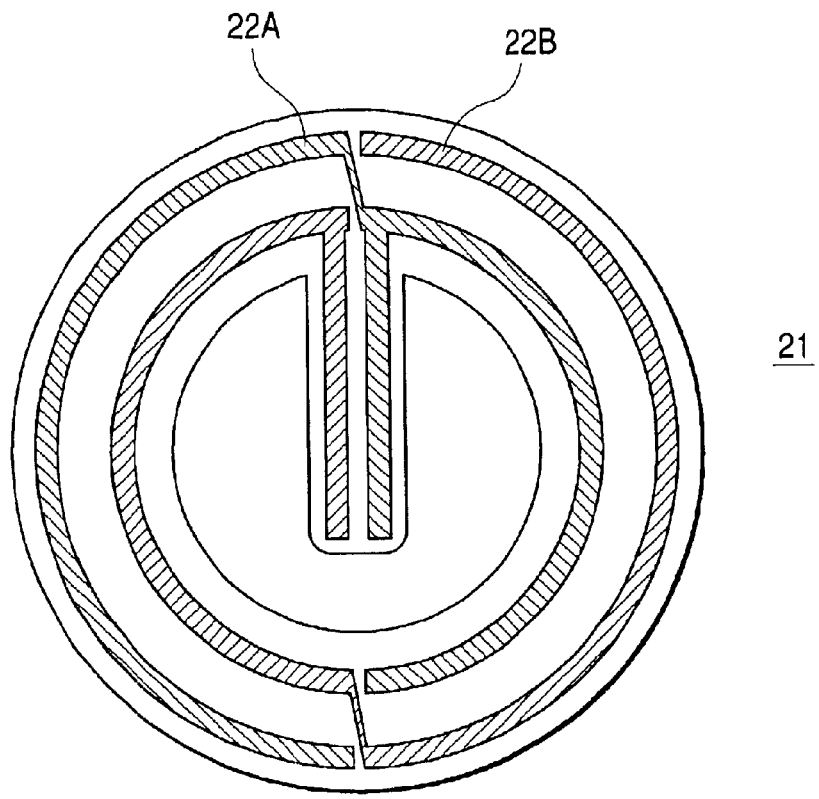
FIG. 3 is a view showing an electrode film for applying an alternating voltage to the piezoelectric element shown in FIG. 2.

FIG. 2 shows a plan view of the piezoelectric element 21. One side of the piezoelectric element 21 is divided into two circles with different radiuses. In each circle, positive electrodes (+) and negative electrodes (−) are formed which are polarized while being alternately reversed in their thickness direction. In FIG. 2, electrodes 201 to 206 on the left outer circumference side and electrodes 207 to 212 on the right inner circumference side form a first electrode group, and electrodes 301 to 306 on the right outer circumference side and electrodes 307 to 312 on the left inner circumference side form a second electrode group. Electrodes shown in FIG. 3 are formed on the piezoelectric element 21. An alternating voltage is applied to the first electrode group from an electrode 22A and an alternating voltage, whose phase is shifted by 90 degrees from the alternating voltage applied from the electrode 22A, is applied to the second electrode group from an electrode 22B. Wavelengths and amplitudes of these alternating voltages are equal. When these alternating voltages are applied, a fifth order standing wave vibration is generated in the first electrode group and the second electrode group. The electrodes 22A and 22B are formed on one side of the piezoelectric element 21 by, for example, screen printing and evaporation.

Figure 4:
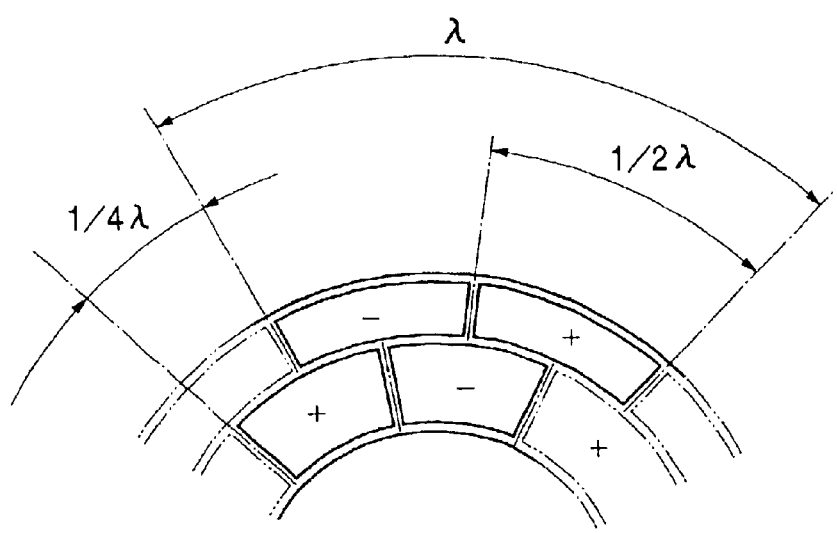
FIG. 4 is a view showing a positional relationship of electrodes in the electrode pattern shown in FIG. 2.

FIG. 4 is a view showing a size and a positional relationship of the electrodes. The electrodes 202 to 205, the electrodes 208 to 211, the electrodes 302 to 305 and the electrodes 308 to 311 have a size that is ½ of a wavelength λ of the above-described standing wave in the peripheral direction of the piezoelectric element 21. In addition, positions of the electrodes on the outer circumference side and positions of the electrodes on the inner circumference side deviate from each other in the peripheral direction by λ/4. However, in each electrode group, respective pairs of the electrodes 206 and 207, the electrodes 306 and 307, the electrodes 212 and 201 and the electrodes 312 and 301, which are in positions where the inner circumference side and the outer circumference side change places, have the size of λ/2. Further, in order to equalize an area of the electrodes on the outer circumference side with an area of the electrodes on the inner circumference side, the electrodes are formed such that the electrodes located on the inner circumference side has a larger width in the radius direction of the piezoelectric element.

Consequently, areas of the electrodes 202 to 205, the electrodes 208 to 211, the electrodes 302 to 305 and the electrodes 308 to 311 are equalized with each other. In addition, a total area of the electrodes 201 and 212, a total area of the electrodes 206 and 207, a total area of the electrodes 301 and 312 and a total area of the electrodes 306 and 307 are also equalized with each other. That is, the total areas of the first electrode group and the second electrode group are equal, and each electrode group can form an electrode having an equal area over the entire circumference.

FIGS. 5A to 5D show standing wave vibrations generated in the first and second electrode groups and a composited vibration of these standing wave vibrations. In the figure, the horizontal axis indicates a position in the peripheral direction of the piezoelectric element 21.

Figure 5A:
FIGS. 5A, 5B, 5C and 5D are views showing amplitudes of vibrations generated in the piezoelectric element shown in FIG. 2.
Figure 5B:
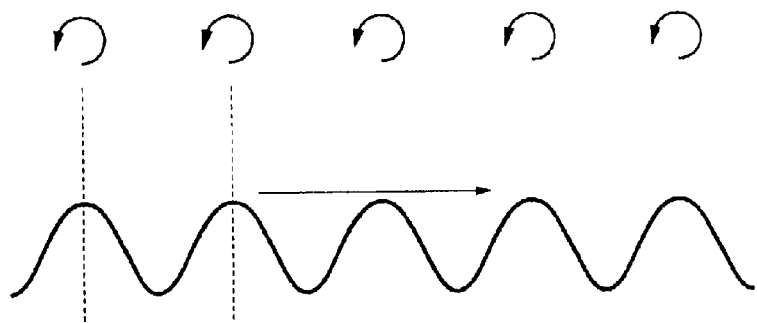
Figure 5C:
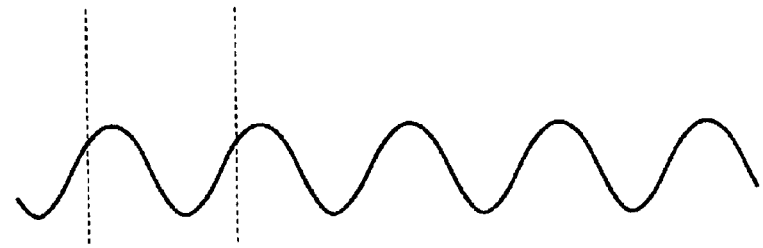
Figure 5D:
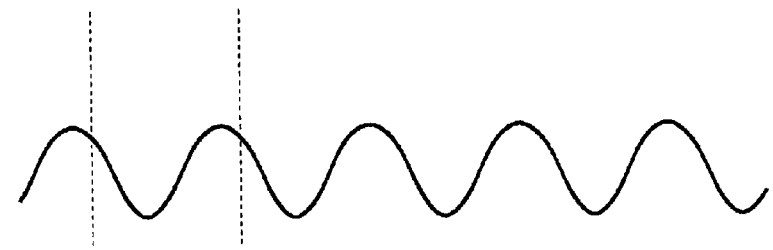

FIG. 5C shows an A phase standing wave vibration generated by the first electrode group and FIG. 5D shows a B phase standing wave vibration generated by the second electrode group. As described above, alternating voltages of an identical wavelength and an identical amplitude, whose phases are shifted by 90 degrees from each other, are applied to the first electrode group and the second electrode group, and the first electrode group and the second electrode group are arranged to deviate from each other in the peripheral direction by λ/4. When these standing wave vibrations are composited, a traveling wave vibration shown in FIG. 5B is obtained. This traveling wave vibration has a uniform wavelength and a uniform amplitude over the entire circumference of the piezoelectric element 21 and, as shown in FIG. 5A, loci of rotational movements generated on the surface of the elastic member 10 are uniform. Thus, slipping does not occur between the frictional member 30 of the elastic member 40 and the rotor 60, and vibration energy can be efficiently utilized as driving energy. Therefore, a driving force is increased and, moreover, generation of noise due to unevenness of vibrations and deviated wear of a frictional member can be prevented.

Figure 6:
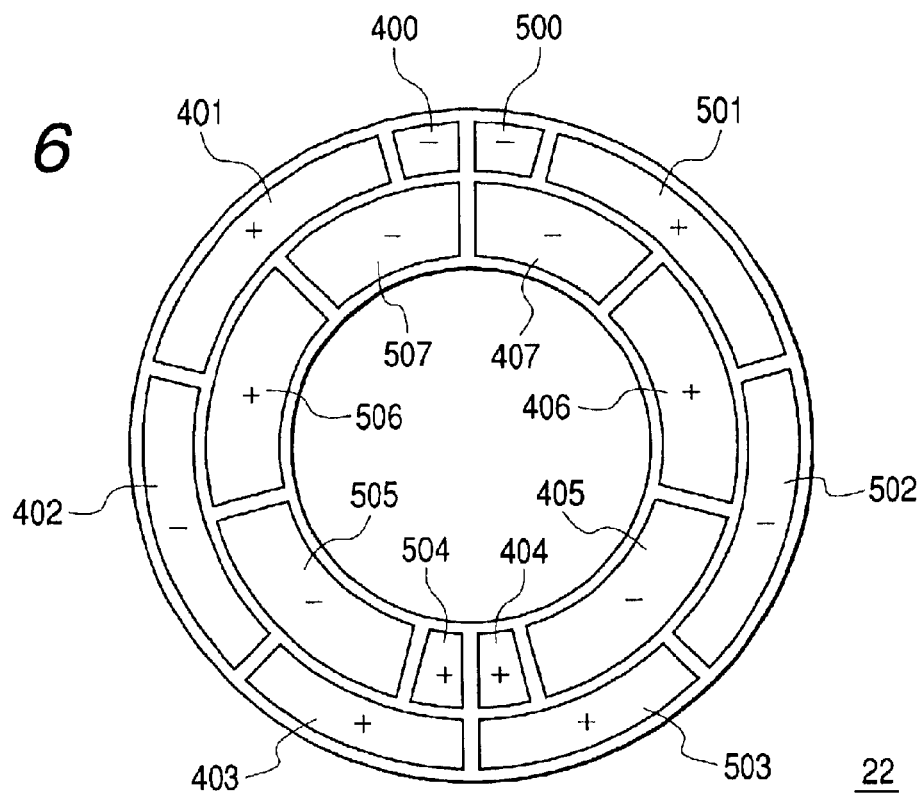
FIG. 6 is a view showing an electrode pattern formed in a plurality of circular areas with different radiuses on a front surface of a piezoelectric element.

FIG. 6 shows a plan view of a piezoelectric element 22 that generates a third order standing wave vibration. Sixteen electrodes are formed on one side of the piezoelectric element 22. The one side of the piezoelectric element 22 is divided into two circles with different radiuses. In each circle, positive electrodes (+) and negative electrodes (−) are formed which are polarized while being alternately reversed in their thickness direction. In FIG. 6, electrodes 400 to 403 on the left outer circumference side and electrodes 404 to 407 on the right inner circumference side form a first electrode group, and electrodes 500 to 503 on the right outer circumference side and electrodes 504 to 507 on the left inner circumference side form a second electrode group.

Then, when alternating voltages of an identical wavelength and an identical amplitude, whose phases are shifted by 90 degrees from each other, are applied to the first electrode group and the second electrode group, two types of third order standing wave vibrations are generated in the piezoelectric element 22. These two standing wave vibrations are composited to generate a traveling wave vibration on a surface of an elastic member.

The electrodes 401, 402, 405 and 406 and the electrodes 501, 502, 505 and 506 have a size that is ½ of a wavelength λ of the above-described standing wave in the peripheral direction of the piezoelectric element 22. In addition, positions of the electrodes on the outer circumference side and positions of the electrodes on the inner circumference side deviate from each other in the peripheral direction by λ/4. However, in each electrode group, respective pairs of the electrodes 403 and 404, the electrodes 503 and 504, the electrodes 407 and 400 and the electrodes 507 and 500, which are in positions where the inner circumference side and the outer circumference side change places, have the size of λ/2. Further, in order to equalize an area of the electrodes on the outer circumference side with an area of the electrodes on the inner circumference side, the electrodes are formed such that the electrodes located on the inner circumference side have a larger width in the radius direction of the piezoelectric element.

Consequently, areas of the electrodes 401 and 402, the electrodes 501 and 502, the electrodes 405 and 406 and the electrodes 505 and 506 are equalized with each other. In addition, a total area of the electrodes 403 and 404, a total area of the electrodes 503 and 504, a total area of the electrodes 407 and 400 and a total area of the electrodes 507 and 500 are also equalized with each other. That is, the total areas of the first electrode group and the second electrode group are equal, and each electrode group can form an electrode having an equal area laterally.

As a result, a traveling wave vibration generated on the surface of the elastic member 10 has a uniform wavelength and a uniform amplitude over the entire circumference of the piezoelectric element 22 and loci of rotational movements are uniform.

Figure 7:
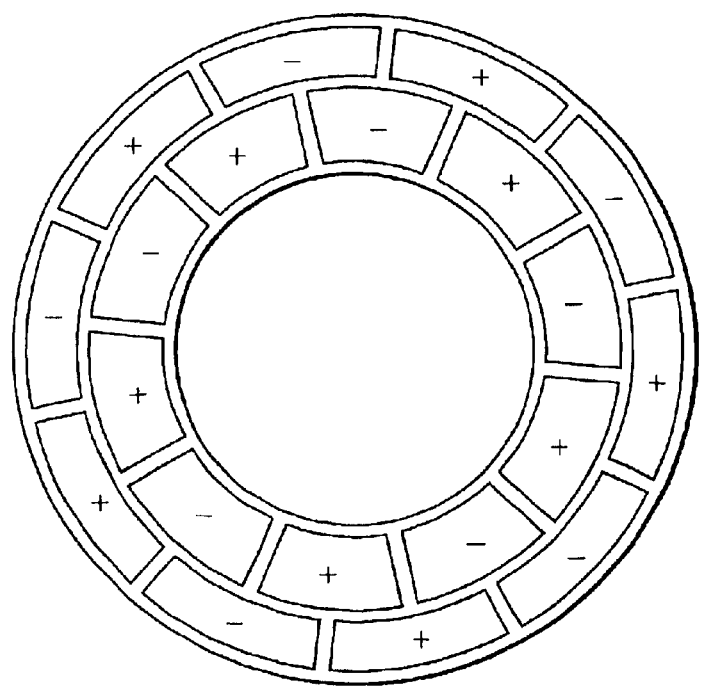
FIG. 7 is a view showing an electrode pattern formed in a plurality of circular areas with different radiuses on a front surface of a piezoelectric element.

FIG. 7 shows another embodiment of the present invention.

A piezoelectric element 23 shown in FIG. 7 has an electrode pattern on one side that is different from that of the piezoelectric element 21 shown in FIG. 2.

One side of the piezoelectric element 23 is also divided into two circles with different radiuses. In each circle, positive electrodes (+) and negative electrodes (−) are formed which are polarized while being alternately reversed in their thickness direction. However, the piezoelectric element 23 is different from the piezoelectric element 21 in that a first electrode group for generating an A phase standing wave vibration is arranged only on its outer circumference side and a second electrode group for generating a B phase standing wave vibration is arranged only on its inner circumference side.

Each electrode has a size that is ½ of a wavelength λ of a standing wave vibration it generates in the peripheral direction. In addition, a phase of the electrodes on the outer circumference side and a phase of the electrodes on the inner circumference side deviate from each other by λ/4. Moreover, in order to equalize an area of the electrodes on the outer circumference side with an area of the electrodes on the inner circumference side, the electrodes are formed such that the electrodes located on the inner circumference side have a larger width in the radius direction of the piezoelectric element compared with the electrodes located on the outer circumference side.

Then, when alternating voltages of an identical wavelength and an identical amplitude, whose phases are shifted by 90 degrees from each other, are applied to the first electrode group and the second electrode group, a traveling wave vibration is generated in the piezoelectric element 23. Also, in this piezoelectric element 23, this traveling wave vibration has a uniform wavelength and a uniform amplitude over the entire circumference of the piezoelectric element 23 and loci of rotational movements generated on the surface of the elastic member 10 are uniform.

Figure 8:
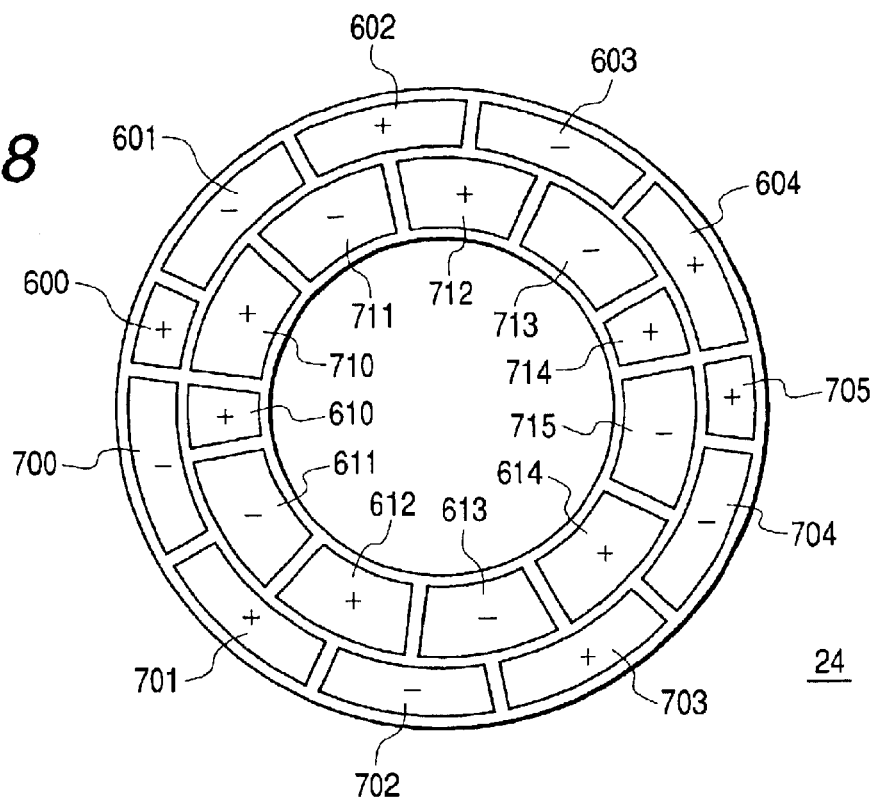
FIG. 8 is a view showing an electrode pattern formed in a plurality of circular areas with different radiuses on a front surface of a piezoelectric element.

FIG. 8 shows yet another embodiment of the present invention.

A piezoelectric element 24 shown in FIG. 8 has an electrode pattern on one side that is different from those of the piezoelectric elements 21 and 23 shown in FIGS. 2 and 7. Twenty-two electrodes are formed on the one side of the piezoelectric element 24.

The one side of the piezoelectric element 24 is also divided into two circles with different radiuses. In each circle, positive electrodes (+) and negative electrodes (−) are formed which are polarized while being alternately reversed in their thickness direction. In FIG. 8, electrodes 600 to 604 on the upper outer circumference side and electrodes 610 to 615 on the lower inner circumference side form a first electrode group, and electrodes 700 to 705 on the lower outer circumference side and electrodes 710 to 714 on the upper inner circumference side form a second electrode group. When alternating voltages of an identical wavelength and an identical amplitude, whose phases are shifted by 90 degrees from each other, are applied to the first electrode group and the second electrode group, a fifth order standing wave vibration is generated in each of the first electrode group and the second electrode group.

The piezoelectric element 24 is different from the piezoelectric elements 21 and 23 in that positions where an inner circumference side and an outer circumference side on which the electrodes of each electrode group are formed change places (a position between the electrodes 600 and 700, a position between the electrodes 610 and 710, a position between the electrodes 604 and 705 and a position between the electrodes 614 and 715) are provided in positions to be nodes of a standing wave vibration such that it is possible to make a total area of electrodes large. Consequently, the number of slits between electrodes can be reduced and the total area of electrodes can be larger than that in the piezoelectric element 21 of FIG. 2. Further, in the piezoelectric element 24, a total area of the first electrode group and a total area of the second electrode group are also identical. Also, in this piezoelectric element 24, a traveling wave vibration generated on the surface of the elastic member 10 also has a uniform wavelength and a uniform amplitude over the entire circumference of the piezoelectric element 24 and loci of rotational movements are uniform.

Figure 9:
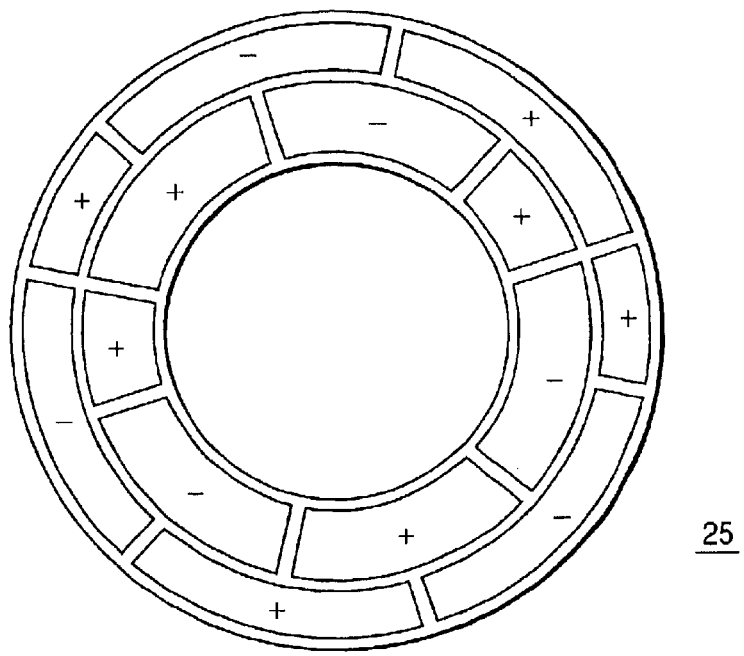
FIG. 9 is a view showing an electrode pattern formed in a plurality of circular areas with different radiuses on a front surface of a piezoelectric element.

In addition, if an electrode pattern shown in FIG. 9 is formed as piezoelectric element for generating a third order standing wave vibration, a total area of electrodes can be larger than that in the electrode pattern shown in FIG. 6 due to the same reason as the electrode pattern shown in FIG. 8.

Further, although a first electrode group and a second electrode group are formed on a piezoelectric element in the above-described embodiment, the present invention is not limited to this. For example, a front surface of a piezoelectric element may be divided into three circles with different radiuses to form a first electrode group, a second electrode group and a third electrode group or to form more electrode groups. In these cases, it is sufficient to form the electrode groups such that the number of electrodes in each electrode group, a total area of each electrode group and an arrangement pattern of each electrode group are equal.

As described above, electrode groups for generating different standing wave vibrations are provided in a plurality of areas of a concentric circle shape with different radiuses, whereby unevenness of traveling wave vibrations generated in the elastic member 10 can be reduced.

Next, another configuration of a piezoelectric element for reducing unevenness of traveling wave vibrations generated in an elastic member will be described.

Figure 10A:
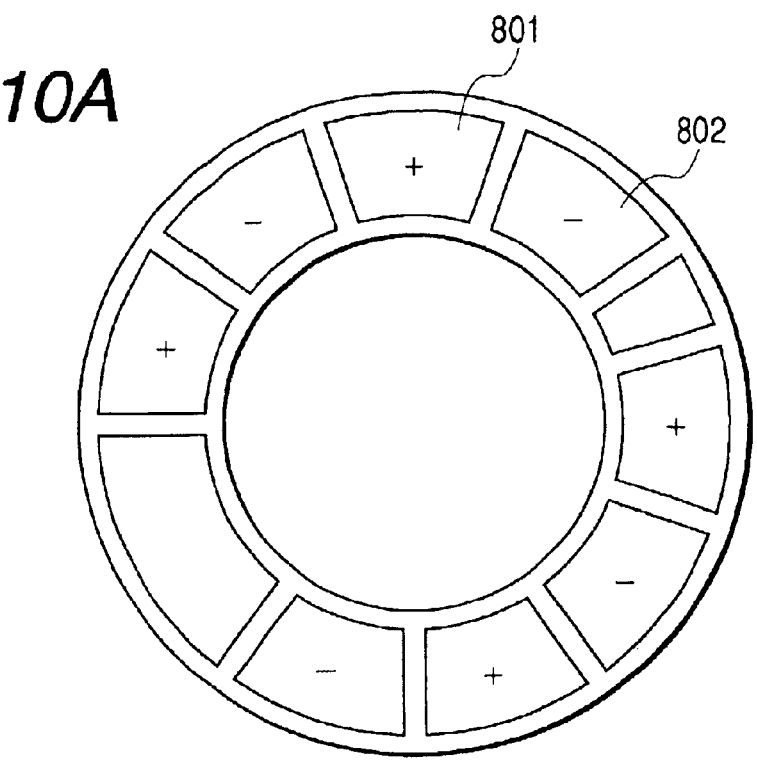
FIGS. 10A and 10B are views showing electrode patterns that are formed on both sides of a piezoelectric element in an identical shape and an identical phase.
Figure 10B:
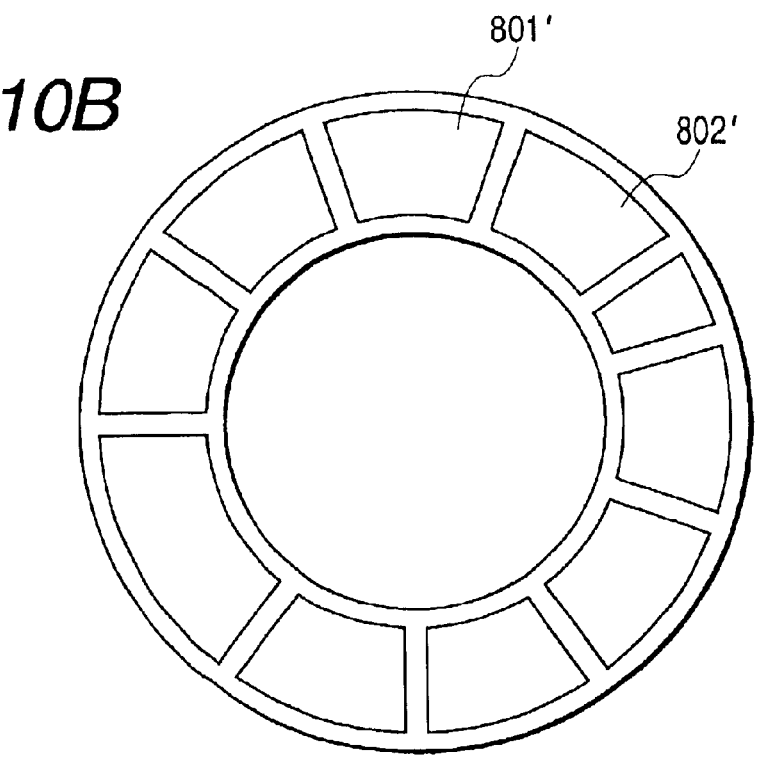
Figure 12:
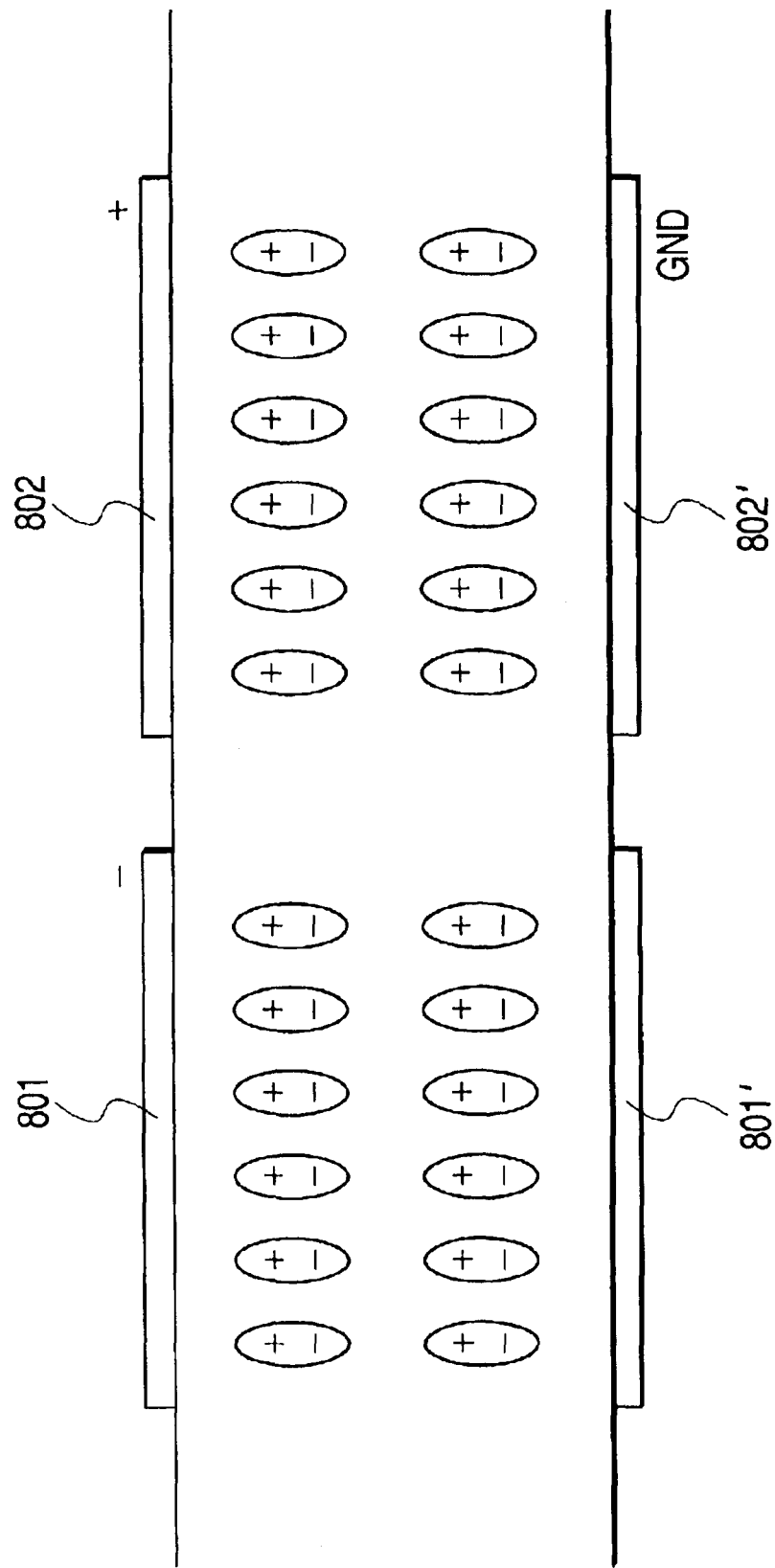
FIG. 12 is a view showing a direction of an electric field at the time of polarization of the piezoelectric element of FIGS. 10A, 10B, 11A and 11B.
Figure 13:
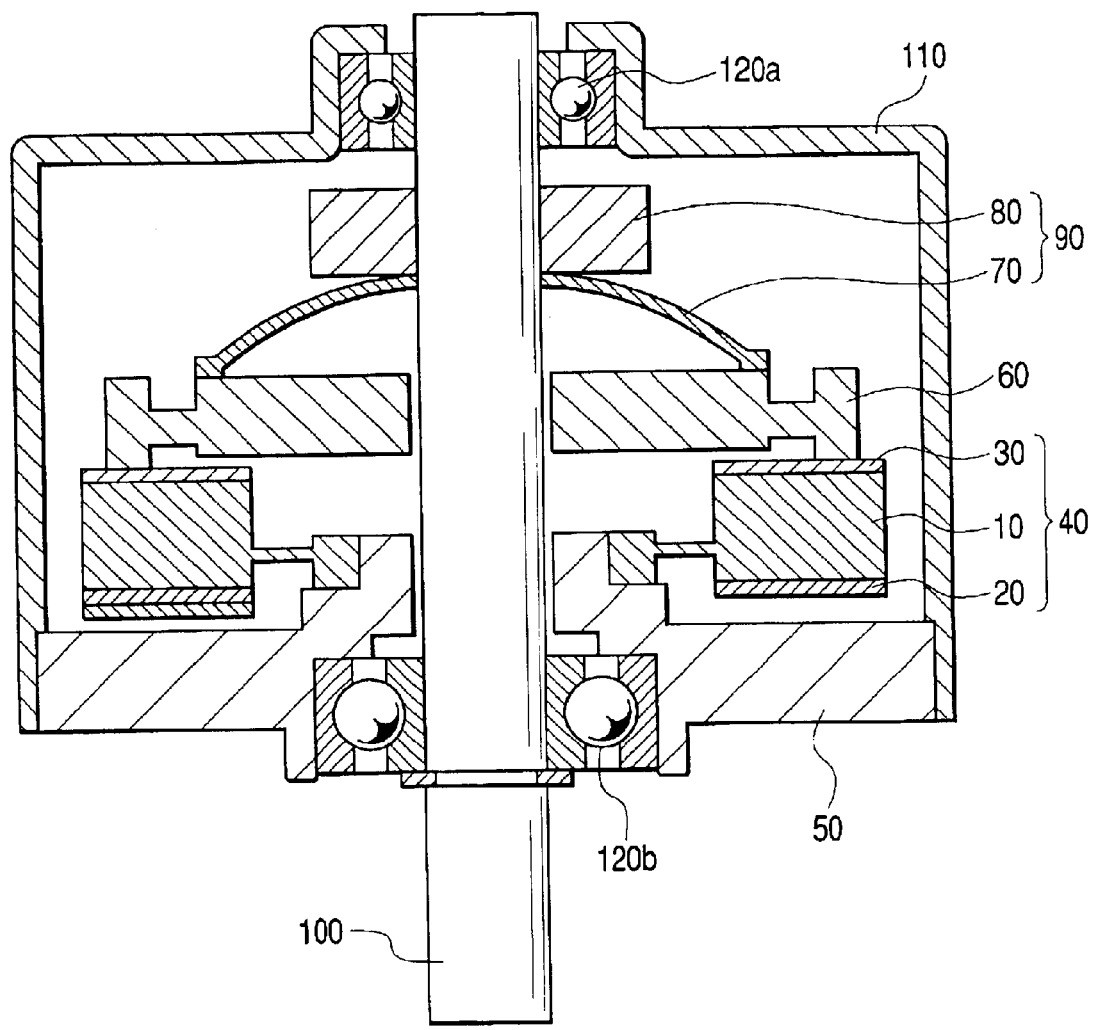
FIG. 13 is a sectional view of a vibration wave motor.
Figure 14A:
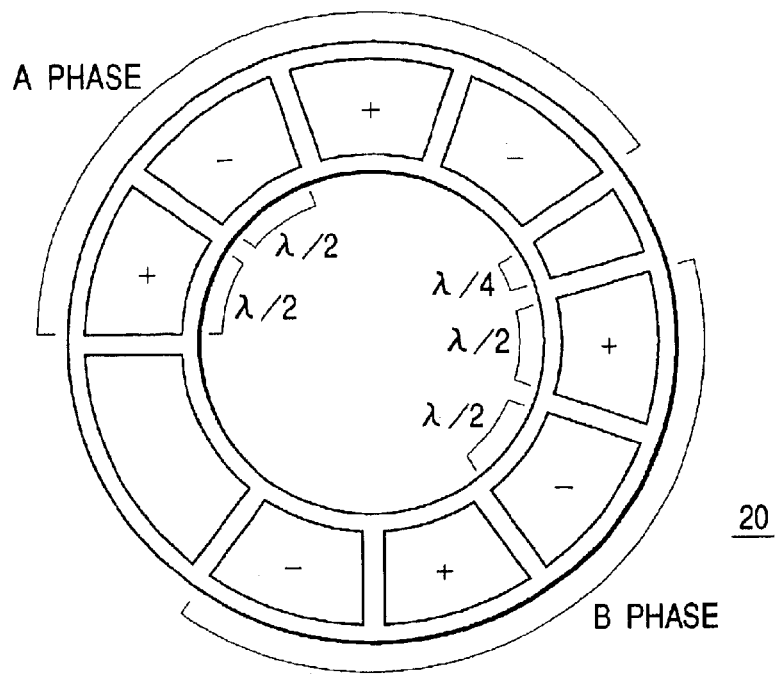
FIGS. 14A and 14B are views showing electrode patterns on both sides of a conventional piezoelectric element.
Figure 14B:
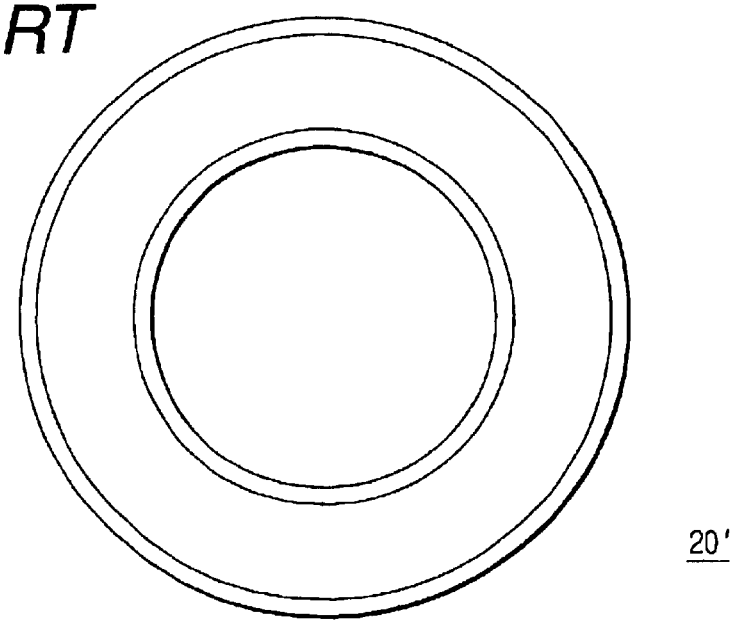
Figure 15A:
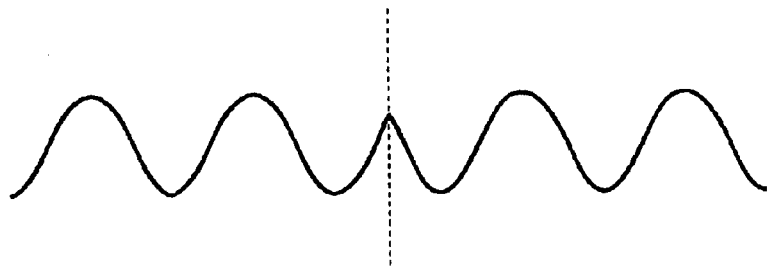
FIGS. 15A, 15B and 15C are views showing amplitudes of vibrations generated in the piezoelectric element of FIGS. 14A and 14B.
Figure 15B:
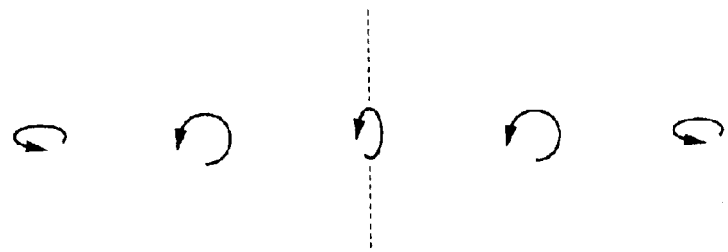
Figure 15C:
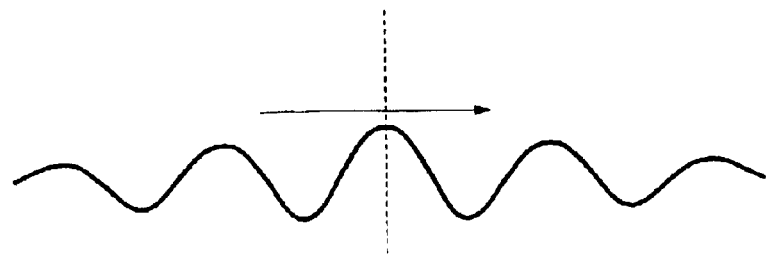

FIG. 10A shows an electrode pattern on a front surface of a piezoelectric element 26 and FIG. 10B shows an electrode pattern of a rear surface of the piezoelectric element 26. The electrode pattern shown in FIG. 10A is identical with the electrode pattern shown in FIG. 14A. As it can be seen from FIGS. 10A and 10B, the electrode patterns on the front surface and the rear surface are formed such that their shapes and phases are completely identical. With this configuration, as shown in FIG. 12, all directions of electric fields applied to the part between the electrode pattern on the front surface and the electrode pattern on the rear surface at the time of polarization are in parallel with a thickness direction of the piezoelectric element 26, and a polarization direction becomes uniform. Therefore, since an elastic modulus of the piezoelectric element 26 becomes uniform, unevenness of traveling wave vibrations generated when an alternating voltage is applied can be reduced.

Figure 11A:
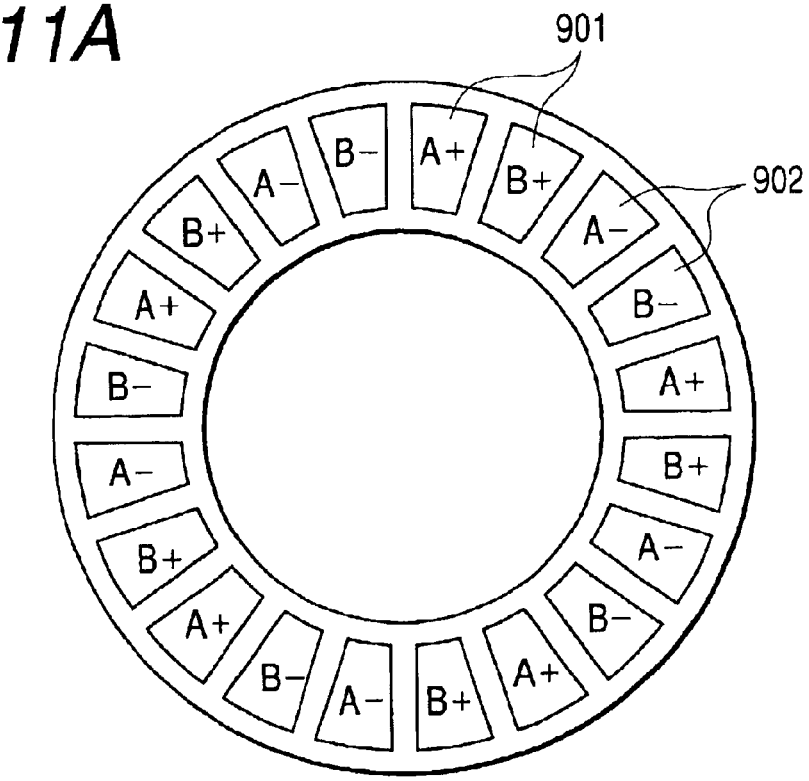
FIGS. 11A and 11B are views showing electrode patterns that are formed on both sides of a piezoelectric element in an identical shape and an identical phase.
Figure 11B:
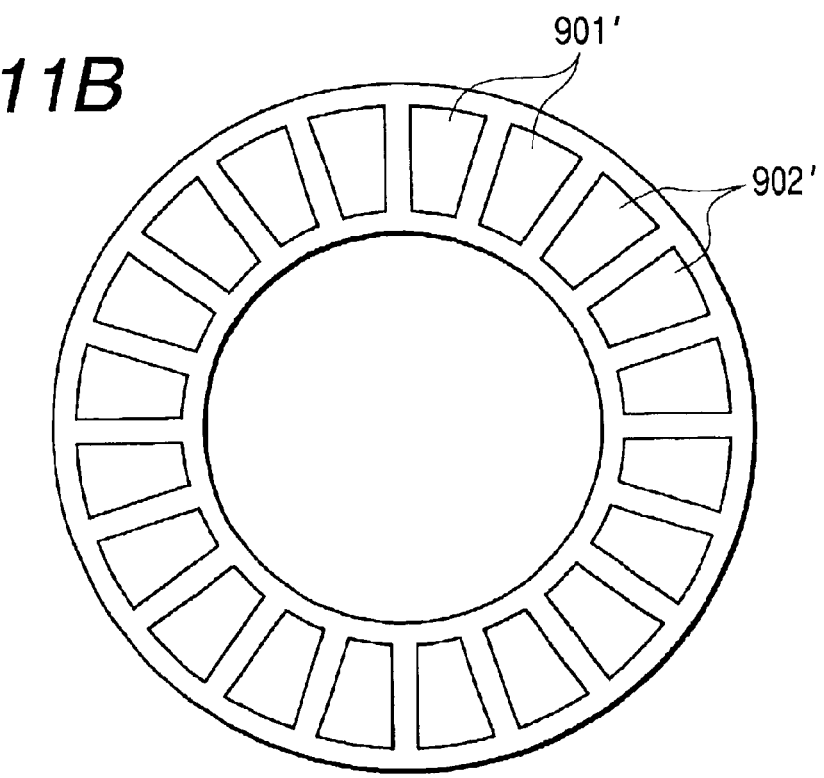

FIG. 11A shows an electrode pattern on a front surface of a piezoelectric element 27 and FIG. 11B shows an electrode pattern on a rear surface of the piezoelectric element 27. The electrode pattern shown in FIG. 11A is for generating two standing wave vibrations of a wavelength λ and is formed at a pitch for one electrode of λ/4. In the electrode pattern, positive electrodes (+) for generating an A phase standing wave vibration, positive electrodes (+) for generating a B phase standing wave vibration, negative electrodes (−) for generating an A phase standing wave vibration and negative electrodes (−) for generating a B phase standing wave vibration are arranged in the peripheral direction in this order. When alternating voltages of an identical wavelength and an identical amplitude, whose phases are shifted by 90 degrees from each other, are applied to a first electrode group for generating an A phase standing wave vibration and a second electrode group for generating a B phase standing wave vibration, a traveling wave vibration is generated in the piezoelectric element 27.

The electrode pattern on the rear surface shown in FIG. 11B is formed such that its shape and phase are completely identical with those of the electrode pattern on the front surface. With this configuration, as shown in FIG. 12, all directions of electric fields applied to the part between the electrode pattern on the front surface and the electrode pattern on the rear surface at the time of polarization are in parallel with a thickness direction of the piezoelectric element 27, and a polarization direction becomes uniform. Therefore, since an elastic modulus of the piezoelectric element 27 becomes uniform, unevenness of traveling wave vibrations generated when an alternating voltage is applied can be reduced.

As described above, electrode patterns whose shapes and phases are both identical with each other are provided on a front surface and a rear surface of a piezoelectric element, whereby unevenness of traveling wave vibrations generated in the elastic member 10 can be reduced.

In addition, electrode patterns are not limited to those shown in FIGS. 10A, 10B, 11A and 11B. For example, the electrode patterns shown in FIGS. 1 to 9 may be provided on both sides of a piezoelectric element.

What is claimed is:

1. A vibration member comprising:
   an elastic member; and
   a circular electro-mechanical energy conversion element that is fixed to said elastic member and has an electrode film formed on at least one side;
   wherein said electro-mechanical energy conversion element has at least a first electrode group in which a plurality of electrodes are provided on a first circumference, the first electrode group being made up of a first portion of electrodes and a distinct second portion of electrodes, and a second electrode group in which a plurality of electrodes are provided on a second circumference different than the first circumference, the second electrode group being made up of a first portion of electrodes and a distinct second portion of electrodes,
   wherein a first standing wave is generated on a surface of said vibration member by applying a first alternating signal to the first portion of electrodes of the first electrode group and to the first portion of electrodes of the second electrode group, and a second standing wave is generated on the surface of said vibration member by applying a second alternating signal to the second portion of electrodes of the first electrode group and to the second portion of electrodes of the second electrode group, and
   wherein a traveling wave is excited on said surface of said vibration member by compositing said first standing wave and said second standing wave.

2. A vibration member according to claim 1,
   wherein the plurality of electrodes in the first electrode group, provided on the first circumference, have non-electrode portions therebetween,
   wherein the plurality of electrodes in the second electrode group, provided on the second circumference, have non-electrode portions therebetween, and
   wherein the non-electrode portions between the plurality of electrodes in the first electrode group are phase-shifted with respect to the non-electrode portions between the plurality of electrodes in the second electrode group.

3. A vibration member according to claim 1, wherein total areas of electrodes formed on the first circumference and on the second circumference are equal to each other.

4. A vibration wave driving apparatus comprising:

a vibration member comprising an elastic member and a circular electro-mechanical energy conversion element fixed to said elastic member, said vibration member generating a traveling wave, in which a plurality of standing waves are composited, on a driving surface thereof when a plurality of alternating signals are applied to said electro-mechanical energy conversion element; and a rotor contacting the driving surface of said vibration member, wherein said electro-mechanical energy conversion element has at least a first electrode group in which a plurality of electrodes are provided on a first circumference, the first electrode group being made up of a first portion of electrodes and a distinct second portion of electrodes, and a second electrode group in which a plurality of electrodes are provided on a second circumference different than the first circumference, the second electrode group being made up of a first portion of electrodes and a distinct second portion of electrodes, wherein a first standing wave is generated on a surface of said vibration member by applying a first alternating signal to the first portion of electrodes of the first electrode group and to the first portion of electrodes of the second electrode group, and a second standing wave is generated on the surface of said vibration member by applying a second alternating signal to the second portion of electrodes of the first electrode group and to the second portion of electrodes of the second electrode group, and wherein said traveling wave is excited on said surface of said vibration member by compositing said first standing wave and said second standing wave.

5. A vibration wave driving apparatus according to claim 4, wherein the plurality of electrodes in the first electrode group, provided on the first circumference, have non-electrode portions therebetween, wherein the plurality of electrodes in the second electrode group, provided on the second circumference, have non-electrode portions therebetween, and wherein the non-electrode portions between the plurality of electrodes in the first electrode group are phase-shifted with respect to the non-electrode portions between the plurality of electrodes in the second electrode group.

6. A vibration wave driving apparatus according to claim 4, wherein total areas of electrodes formed on the first circumference and on the second circumference are equal to each other.

* * * * *

UNITED STATES PATENT AND TRADEMARK OFFICE
CERTIFICATE OF CORRECTION

PATENT NO. : 6,943,481 B2  Page 1 of 1
DATED : September 13, 2005
INVENTOR(S) : Takuji Okamoto et al.

It is certified that error appears in the above-identified patent and that said Letters Patent is hereby corrected as shown below:

<u>Column 8,</u>
Line 30, "side;" should read -- side, --.

Signed and Sealed this

Eleventh Day of April, 2006

JON W. DUDAS
*Director of the United States Patent and Trademark Office*